United States Patent [19]

Watanabe

[11] Patent Number: 4,567,419

[45] Date of Patent: Jan. 28, 1986

[54] CONTROL APPARATUS FOR ELEVATOR

[75] Inventor: Eiki Watanabe, Inazawa, Japan

[73] Assignee: Mitsubishi Denki Kabushiki Kaisha, Tokyo, Japan

[21] Appl. No.: 627,655

[22] Filed: Jul. 3, 1984

[30] Foreign Application Priority Data

Jul. 6, 1983 [JP] Japan ................................ 58-122614

[51] Int. Cl.$^4$ ........................... H02P 5/40; B66B 1/30
[52] U.S. Cl. ................................ 318/798; 187/29 R; 318/805
[58] Field of Search ............................. 318/805, 798; 324/158 MG; 187/29 MC, 29 AC

[56] References Cited

U.S. PATENT DOCUMENTS

| | | | |
|---|---|---|---|
| 4,423,367 | 12/1983 | Blaschke et al. | 318/805 |
| 4,431,957 | 2/1984 | Chausse et al. | 318/805 |
| 4,441,065 | 4/1984 | Bayer et al. | 318/808 |
| 4,447,787 | 5/1984 | Schwesig et al. | 318/805 |

Primary Examiner—David Smith, Jr.
Attorney, Agent, or Firm—Leydig, Voit & Mayer Ltd.

[57] ABSTRACT

A control apparatus for an elevator comprising a temperature sensor which senses the temperature of the rotor of an induction motor during the stoppage of a cage, and a voltage/frequency control device which calculates the secondary winding resistance value of the induction motor on the basis of the output value of the temperature sensor and which vector-controls a power conversion device by the use of the calculated secondary winding resistance value, so that during the stoppage of the elevator, the temperature of the rotor is measured to alter the secondary winding resistance value necessary for the vector control, whereby the optimum control can be performed.

15 Claims, 6 Drawing Figures

CONTROL APPARATUS FOR ELEVATOR

BACKGROUND OF THE INVENTION

The present invention relates to a control apparatus for an elevator in which an induction motor for driving a cage is subjected to the variable voltage and variable frequency control (hereinbelow, termed "V.V.V.F. control"), and more particularly to improvements in the control performance of a vector control operation.

FIG. 1 is a block diagram showing the arrangement of a control apparatus of this type, along with a system for balancing a cage. Referring to the figure, a hoisting rope 3 is wound round a sheave 1 as well as a deflector wheel 2. A cage 4 is coupled to one end of this hoisting rope 3, and a balance weight 5 to the other end. Disposed below them is a tension pulley 6, a round which a compensation rope 7 is wound with its one end coupled to the cage 4 and its other end coupled to the weight 5. A brake 8 is disposed on the outer side of the sheave 1.

Here, the sheave 1 is coupled to an induction motor 9. In order to drive this induction motor 9, the control apparatus comprises a power conversion device which includes a thyristor converter 11 connected to a three-phase A.C. power source 10, a capacitor 12 for smoothing the rectified voltage of the thyristor converter, and a transistor inverter 13 for inverting the smoothed direct current into alternating current; and a voltage/frequency control device (hereinbelow, simply termed "control device") 20 which controls the power conversion device by receiving the current signal of a current sensor 14 for detecting the current of the induction motor 9 and the velocity signal of a velocity sensor (tachometer generator) 15 for sensing the rotational velocity of the induction motor 9.

In this case, the control device 20 has an interface (I/F), a read only memory (ROM), a random access memory (RAM) and a microprocessor (CPU). It receives and stores control command values besides the signals of the aforementioned sensors, and subjects the power conversion device to the pulse width modulation (PWM) control on the basis of the stored data. Thus, the A.C. voltage of an approximate sinusoidal wave having any desired voltage value and frequency value is applied to the induction motor 9.

With such control apparatus, when the ratio between the voltage and the fequency is maintained in a predetermined relationship, the output torque of the induction motor 9 can be kept constant. However, when it is intended to attain a control performance equivalent to that of a D.C. motor, the so-called vector control which controls also the phase is required.

FIG. 2 shows an example of arrangement of the control device which is called the "slip frequency type vector control system". Although the actual vector control is performed by the use of a microcomputer, the device is illustrated in model-like fashion here in order to facilitate understanding of the principle.

This control device 20a is composed of a velocity control amplifier 21, a differentiator 22, dividers 23a, 23b, coefficient units 24a–24e, a D.C. component vector computing unit 25, adders 26a, 26b, a vector oscillator 27, a vector multiplier 28, a vector three-phase converter 29, and operational amplifiers 30a, 30b, 30c.

Now, the outline of the slip frequency vector control will be described with reference to FIG. 2.

The slip frequency vector control evaluates a magnetic flux component current and a torque component current as values on secondary magnetic flux coordinates. When to be changed into primary current values on fixed coordinates, they are changed without detecting a secondary magnetic flux vector.

In this case, a slip frequency which is determined by the magnetic flux component current and the torque component current is calculated using motor constants. This slip frequency and a rotational velocity are subsequently added to find the rotational velocity of the secondary magnetic flux. This rotational velocity is further integrated to obtain a position, which is used for the coordinate transformation as the estimated position of the secondary magnetic flux.

Thus, the control device is supplied with a motor velocity signal as the state variable of the induction motor for the addition with the slip frequency, but it is not supplied with any signal concerning the secondary magnetic flux. The magnetic flux control does not perform the feedback control, either, and a first-order lead is directly calculated and obtained from a secondary magnetic flux command so as to compensate for the first-order lag response of the secondary magnetic flux to the magnetic flux component current.

Accordingly, the slip frequency vector control is a kind of predictive control which performs the control while estimating the magnetic flux vector by the calculations.

In FIG. 2, the control device 20a is supplied with the velocity signal $\omega_r$ of the velocity sensor 15 and a velocity command $\omega_r^*$ as well as a secondary magnetic flux command $\phi_2^*$. The velocity signal $\omega_r$ and the velocity command $\omega_r^*$ are applied to the velocity control amplifier 21. A value obtained by amplifying the deviation between them is denoted as a torque command $T_M^*$. This torque command $T_M^*$ is divided by a secondary magnetic flux command $\phi_2^*$ by means of divider 23a, to obtain a secondary q-axis current command $-i_{2q}^*$. This secondary q-axis current command $-i_{2q}^*$ is multiplied by $L_2/M$ by means of the coefficient unit 24a, to obtain a torque component current command $i_{1q}^*$. Here, $L_2$ denotes a self-inductance of a secondary (rotor) winding, and M the mutual inductance between a primary (stator) winding and the secondary (rotor) winding.

After the secondary magnetic flux command $\phi_2^*$ is differentiated by the differentiator 22, it is multiplied by $1/R_2$ by means of the coefficient unit 24b. Further, the resulting product is multiplied by $L_2/M$ by means of the coefficient unit 24c, and the product thus obtained is applied as an input to the adder 26a as current for forming the secondary magnetic flux proportional to a time variation rate. Here, $R_2$ denotes the resistance of the secondary winding. On the other hand, the secondary magnetic flux command $\phi_2^*$ is multiplied by $1/M$ by means of the coefficient unit 24d, and the product thus obtained is applied as an input to the adder 26a as an exciting current for obtaining the secondary magnetic flux. The adder 26a sums both the inputs, and delivers as an output a magnetic flux component current command $i_{1d}^*$ which compensates for the secondary magnetic flux with the first-order lag over the magnetic flux component current. A forming voltage must be generated across the secondary winding because of the indirect control of the secondary magnetic flux, and the above is intended to generate this voltage by causing a forming current to flow through the secondary winding.

Meanwhile, the secondary q-axis current command $-i_{2q}^*$ is multiplied by $R_2$ by means of the coefficient unit 24e and is subsequently divided by the secondary magnetic flux command value $\phi_2^*$ by means of the divider 23b, the resulting quotient being applied to the adder 26b as a slip frequency command $\omega_s^*$. This adder 26b adds the slip frequency command $\omega_s^*$ and the aforementioned velocity signal $\omega_r$, to evaluate the velocity command $\omega_0^*$ of the secondary magnetic flux and to apply it to the vector oscillator 27.

This vector oscillator 27 obtains a unit vector $e^{j\theta_o^*}$ which indicates the predictive position $\theta_o^* (= \int \omega_o^* \, dt)$ of the secondary magnetic flux.

The magnetic flux component vector computing unit 25 obtains that primary current vector $i_1^*(\theta_o^*)$ on secondary magnetic flux coordinates which is determined by the torque component current command $i_{1q}^*$ and the magnetic flux component current command $i_{1d}^*$.

The unit vector $e^{j\theta_o^*}$ and the primary current vector $i_1^*(\theta_o^*)$ which have been thus obtained are multiplied by the vector multiplier 28, to be converted into a primary current vector $i_1^*$ on fixed coordinates, which is applied to the vector three-phase converter 29.

Here, the vector three-phase converter 29 determines the current command values $i_U^*$, $i_V^*$ and $i_W^*$ of the respective phases on the basis of the primary current vector $i_1^*$.

These current command values are applied to the transistor inverter 13 through the operational amplifiers 30a, 30b and 30c, respectively.

Thus, the control device 20 shown in FIG. 1 performs the control substantially as stated above. In the slip frequency type vector control, the induction motor constants $R_2$, $L_2$ and M are necessary. Among them, the resistance $R_2$ of the secondary winding has been handled as a constant value in spite of the fact that it changes conspicuously due to the temperature rise of the rotor.

Therefore, the prior-art control apparatus for the elevator has been less immune against disturbances and has been incapable of a high precision control.

SUMMARY OF THE INVENTION

The present invention has for its principal object to provide a control apparatus for an elevator in which the temperature of a rotor is measured during the stoppage of the elevator, and a secondary winding resistance value required for a vector control is altered, whereby optimum control can be performed.

In order to accomplish this object according to the present invention, for an elevator wherein an induction motor for driving a cage is controlled using a power conversion device which is operative to vary a voltage and a frequency, a control apparatus is provided comprising a temperature sensor which senses the temperature of the rotor of the induction motor during the stoppage of the cage, and a voltage/frequency control device which operates taking into consideration variations in the secondary winding resistance value of the induction motor due to temperature and vector-controls the power conversion device by the use of temperature compensated secondary winding resistance values.

DESCRIPTION OF THE PREFERRED EMBODIMENTS

Figure 1:
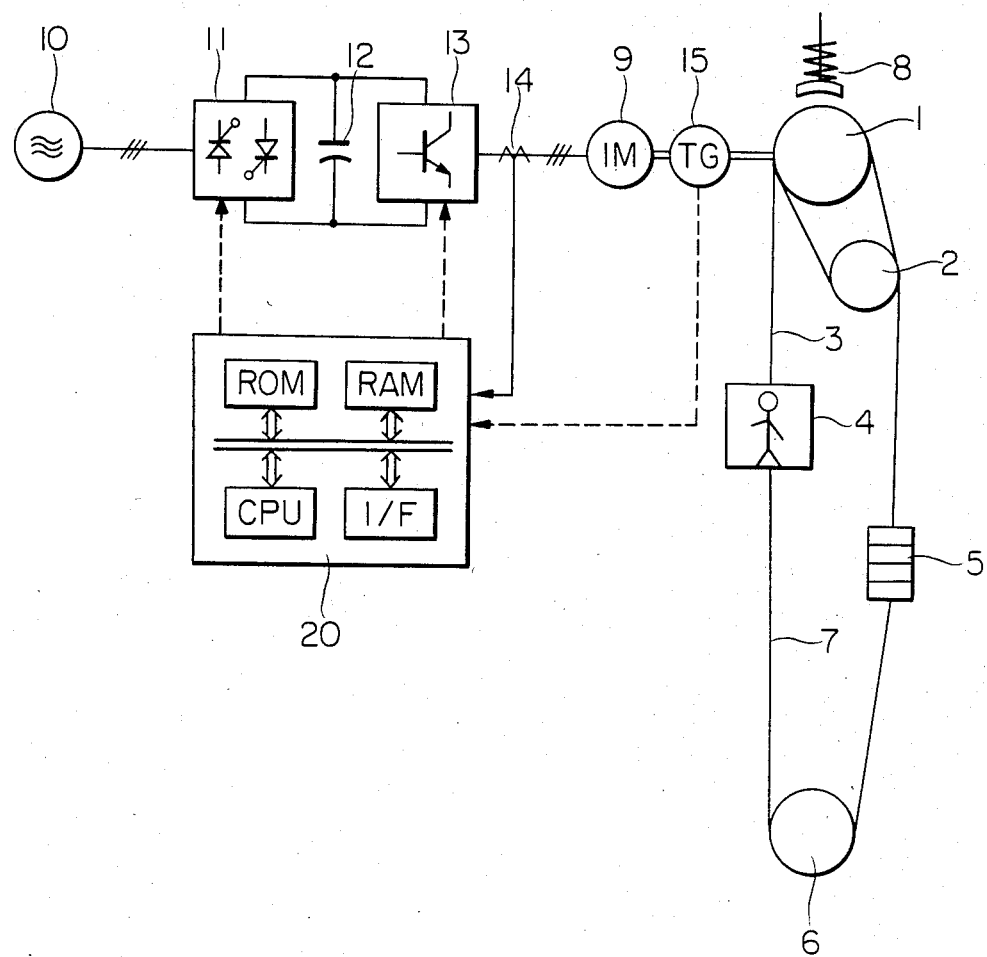
FIG. 1 is a block diagram showing the arrangement of a conventional control apparatus for an elevator, along with a system for balancing a cage.
Figure 3A:
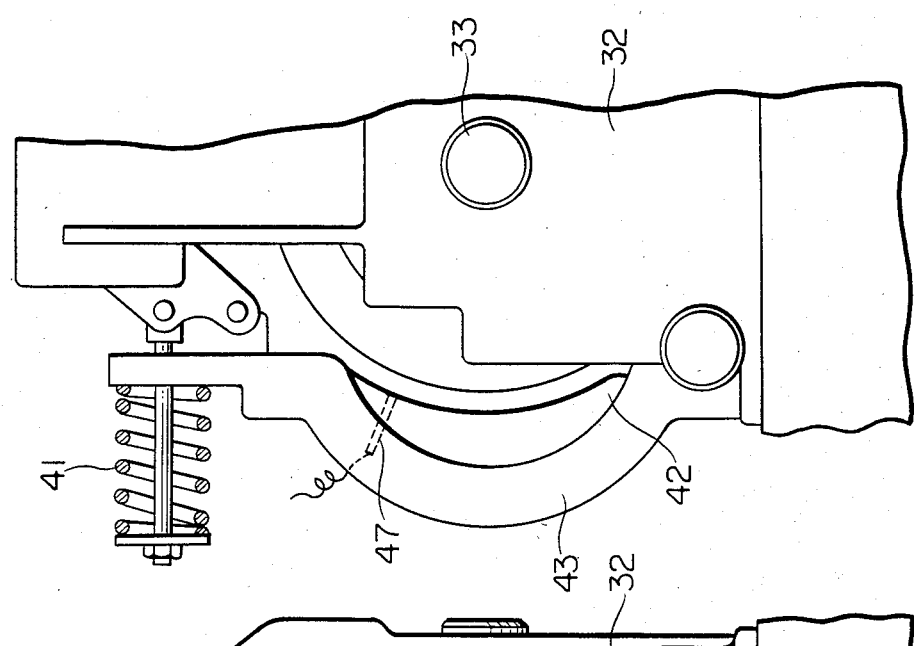
FIGS. 3(a) and 3(b) are a sectional view and a side view respectively, showing the arrangement of the principal elements of one embodiment of a control apparatus for an elevator according to the present invention; along with the controlled equipment.
Figure 3B:
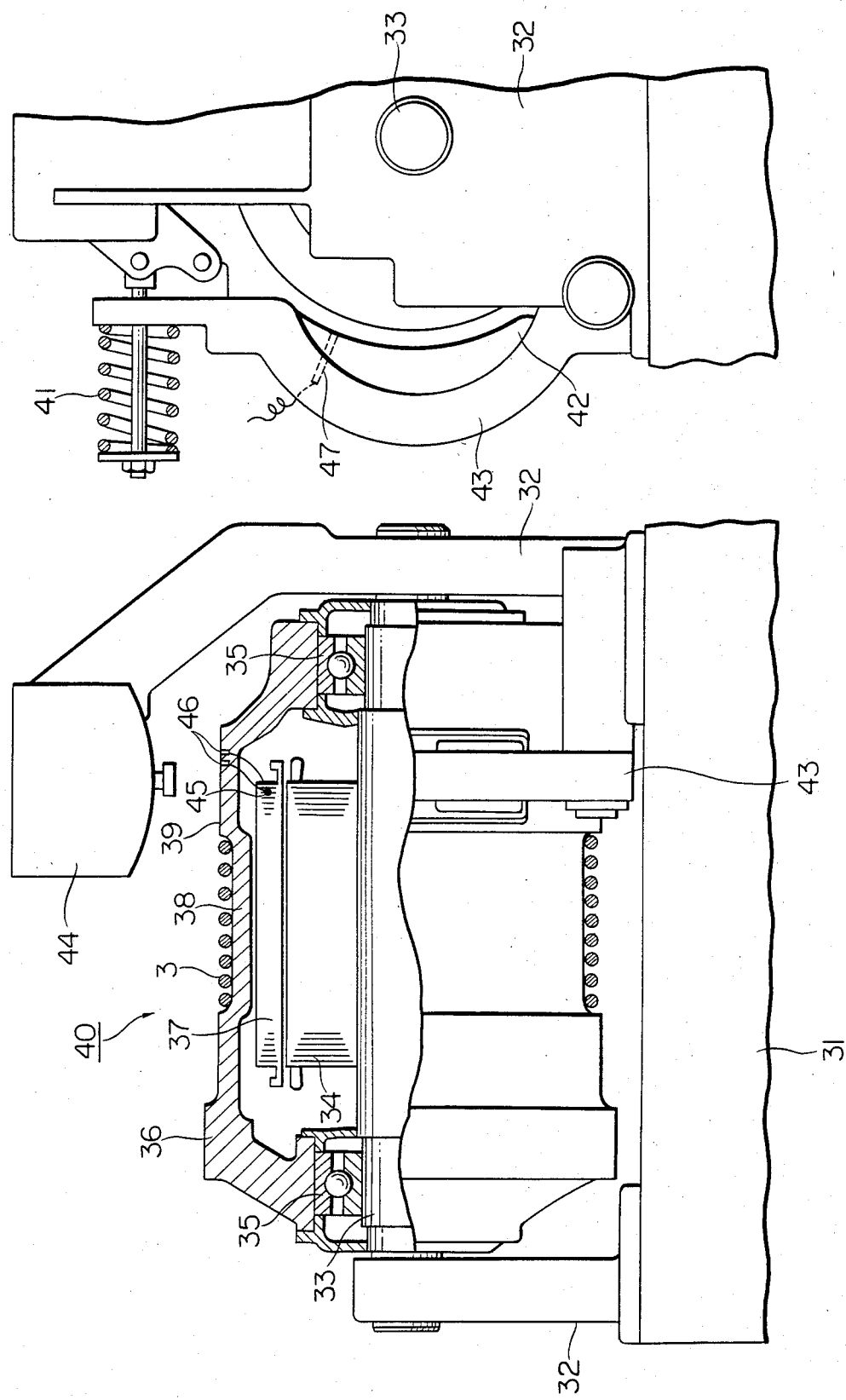

FIGS. 3(a) and 3(b) are a sectional view and a side view of a hoisting machine respectively, showing the arranged state of elements which constitute a control apparatus for an elevator according to the present invention. This hoisting machine 40 is such that the sheave 1, the brake 8 and the induction motor 9 shown in FIG. 1 are unitarily combined, and it is especially called the "outer rotor type hoisting machine".

The outer rotor type hoisting machine has a pair of pedestals 32 disposed on a bed 31, with both the ends of a shaft 33 fixed to the pedestals 32. Further, the primary side members 34 of the induction motor which are a stator core and a stator winding are mounted on the axially intermediate part of the shaft 33. Thus, a stator is constructed of the bed 31, pedestals 32, shaft 33 and primary side members 34.

A rotor frame 36 is turnably supported on the shaft 33 through a pair of bearings 35, and the secondary side members 37 of the induction motor which are a rotor core and a rotor winding are mounted on the inner peripheral part of the rotor frame. Thus, a rotor (also called "outer rotor") is constructed of the rotor frame 36 and the secondary side members 37.

The outer periphery of the rotor frame 36 is formed with a rope winding portion 38 which serves as the sheave, a brake portion 39 which serves as a brake wheel.

On the other hand, a brake arm 43 to which a brake spring 41 and a brake shoe 42 are attached is disposed outside the rotor frame 36. Further, a brake magnet 44 which attracts the brake arm 43 is mounted on the pedestal 32.

In order to obtain the resistance value of the rotor winding, namely, the secondary winding when the cage 4 (FIG. 1) is driven by the hoisting machine of such construction, a thermocouple 45 is disposed in the secondary side member 37, while detecting terminals 46 are disposed so as to be exposed to the outer peripheral surface of the brake portion 39, and both the constitutents 45 and 46 are connected. In addition, the brake arm 43 is provided with counter electrodes 47 which touch the detecting terminals 46 when the brake shoe 42 is pressed against the brake portion 39.

Thus, though not at all times, the counter electrodes 47 touch the detecting terminals 46 when the brake arm 43 is attracted by energizing the brake magnet 44. It is therefore possible to sense the temperature of the secondary winding during the stoppage of the elevator. The temperature value is written into the random access memory (RAM) in the control device 20, and the secondary winding resistance value R₂ is calculated on the basis of this data.

Figure 2:
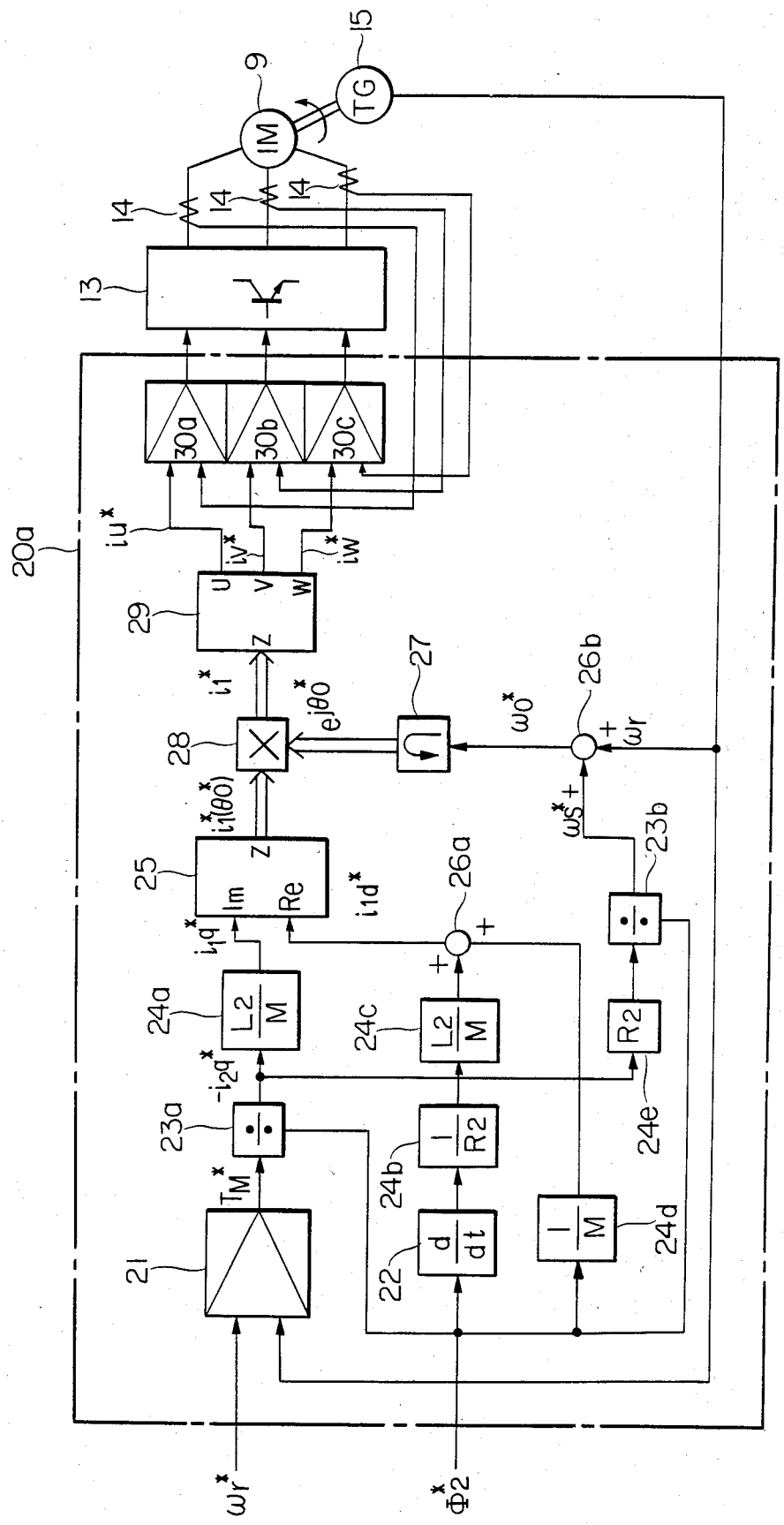
FIG. 2 is a block diagram showing in model-like fashion the arrangement of a prior-art voltage/frequency control device which constitutes the control apparatus.

Since the elevator is repeatedly started and stopped every several seconds—ten odd seconds, a temperature rise attendant upon one ascent or descent operation is considered slight. Accordingly, each time the elevator is stopped, the value R₂ of the coefficient units 24b and 24e explained with reference to FIG. 2 is altered, so that the control performance of the elevator can be sharply enhanced.

Figure 4:
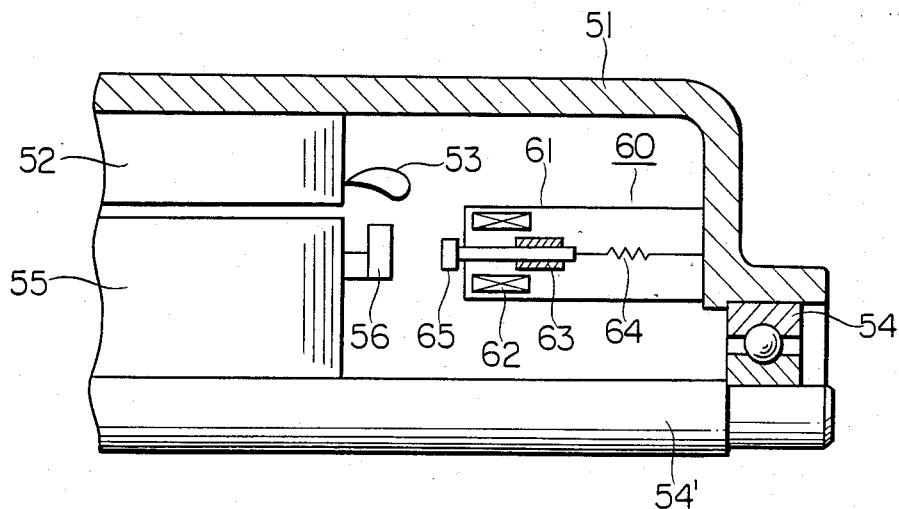
FIG. 4 is a sectional view showing the arrangement of the principal elements of another embodiment, along with the controlled equipment.

Next, FIG. 4 shows an example in which a temperature sensor is installed on an ordinary induction motor. A stator core 52 and a stator winding 53 are mounted on the inner wall part of a stator frame 51, while a rotor core 55 and a rotor winding 56 are mounted on a shaft 54' which is supported through bearings 54.

In order to sense the secondary (rotor) winding temperature of this induction motor, the temperature sensor 60 is mounted on that part of the stator frame 51 which confronts the end part of the rotor core 55. This temperature sensor 60 is composed of an annular electromagnet 62 which is mounted inside a housing 61, an iron core 63 which is supported so as to be movable in the axial direction of the electromagnet, a coiled spring 64 which exerts a force in the direction of pulling back the iron core 63, and a temperature sensing elements, for example, a thermistor or thermocouple, 65 which is disposed at the fore end part of the iron core 63.

In this case, when the electromagnet 62 is energized, the iron core 63 moves to the rotor side, and the temperature sensing element 65 abuts on the secondary winding 56 and sends out an electric signal corresponding to the temperature thereof.

Figure 5:
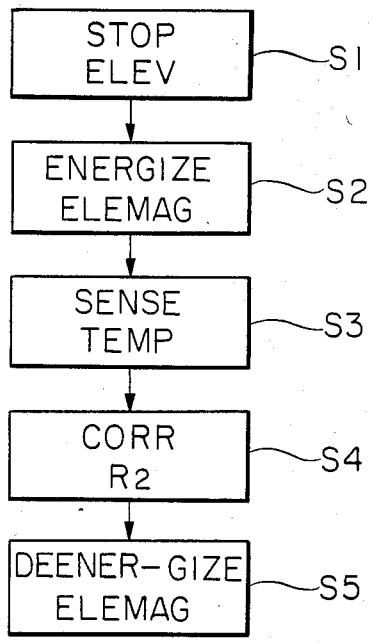
FIG. 5 is a flow chart for explaining the operation of this embodiment.

FIG. 5 is a flow chart which shows the operating procedure in the case of correcting the secondary winding resistance value by use of this temperature sensor. The elevator is stopped (S−1), and the electromagnet 62 is energized upon acknowledging the stoppage (S−2). Subsequently, the temperature is sensed by the output signal of the temperature sensing element 65 (S−3), and the secondary winding resistance value is calculated from the sensed temperature value so as to correct R₂ (S−4).

The value R₂ is calculated with the following equation:

$$R_2 = \frac{234.5 + t}{234.5 + t_o} \times R_o$$

where $R_o$: a resistance value at a temperature $t_o$, measured in advance, t: a temperature measured at present.

When the R₂ correction has been finished, the electromagnet 62 is deenergized (S−5).

Thereafter, when the current of the electromagnet 62 is cut off, the iron core 63 is restored into the illustrated state by the coiled spring 64.

Even for the ordinary induction motor, therefore, the secondary winding resistance value can be corrected and the value R₂ of the coefficient units 24b, 24e explained with reference to FIG. 2 can be altered each time the elevator stops.

As understood from the above description, according to the elevator control apparatus of the present invention, the secondary winding resistance value required for the vector control can be corrected each time the elevator stops, so that the optimum control immune against disturbances becomes possible.

What is claimed is:

1. A control apparatus for an elevator wherein an induction motor having secondary windings included in a rotary member for driving a cage is controlled using a power conversion device operative to vary voltage and frequencies supplied to said motor, said control apparatus comprising temperature sensor means for sensing temperatures of said rotary member of said induction motor during stoppage of said rotary member to stop the cage, and a voltage/frequency control device operated in accordance with resistance variations of said secondary windings based on temperature changes of said rotary member sensed by said temperature sensor means to vector-control said power conversion device for enhancing the control of said elevator.

2. A control apparatus for an elevator according to claim 1 wherein said voltage/frequency control device includes means to provide a secondary magnetic flux current command, means to provide a secondary magnetic flux velocity command in accordance with said secondary winding resistance variations based on said temperature changes sensed by said sensor means, and means to determine, based on said commands, a current to supply to said induction motor.

3. A control apparatus for an elevator according to claim 1 wherein means are provided on a member adjacent said rotary member for contacting terminals on said rotary member while stopped.

4. A control apparatus for an elevator according to claim 3 wherein said temperature sensor means includes a temperature sensing element carried by the rotary member for sensing said temperatures of said secondary windings of said rotary member.

5. A control apparatus for an elevator according to claim 1 wherein said brake means includes a brake arm having a brake shoe, a brake portion coupled and rotated with said rotary member of said induction motor and contacted by said brake shoe detecting terminals disposed on the outer peripheral surface of said brake portion, and counter electrodes located on said brake arm for transmitting the temperature of said secondary windings sensed by said temperature sensor means to said voltage/frequency control device while said rotary member is stopped.

6. A control apparatus for an elevator according to claim 5 wherein the induction motor is an outer rotor motor, and said brake portion is formed in an outer peripheral surface of an outer rotor of said motor.

7. A control apparatus for an elevator wherein an induction motor having secondary windings included in a rotary member for driving a cage is controlled using a power conversion device operative to vary voltage and frequency supplied to said motor, said control apparatus comprising temperature sensor means for sensing temperatures of said rotary member of said induction motor during stoppage of said rotary member to stop the cage including a temperature sensing element carried by the rotary member for sensing said temperatures of said secondary windings of said rotary member, a movable member adjacent said rotary member movable after the stoppage of the rotary member into operative contact with said temperature sensing element to receive said temperatures sensed by said temperature sensing element, and a voltage/frequency control device operated in accordance with the resistance variations of said secondary windings based on temperature changes of said rotary member sensed by said temperature sensing element to vector-control said power conversion device for enhancing the control of said elevator.

8. A control apparatus for an elevator according to claim 7 wherein said temperature sensor means includes means for separating said movable member from said temperature sensing element of said rotary member while said rotary member is rotating.

9. A control apparatus for an elevator according to claim 7, wherein said rotary member has an end portion and said induction motor has a wall facing said end portion, and means for mounting said movable member of said temperature sensor means on said wall.

10. A control apparatus for an elevator wherein an induction motor having secondary windings included in a rotary member for driving a cage is controlled using a power conversion device operative to vary voltage and frequency supplied to said motor, said control apparatus comprising brake means for stopping said rotary member to stop the cage, means for sensing temperatures of said rotary member including a member of said brake means movable into contact with said rotary member upon operation of said brake means, and a voltage/frequency device operated in accordance with the resistance variations of said secondary windings based on temperature changes of said rotary member sensed by said temperature sensor means to vector-control said power conversion device for enhancing the control of said elevator.

11. A control apparatus for an elevator according to claim 10 wherein said temperature sensor means senses the rotary member temperature during a braking operation of said braking means.

12. A control apparatus for an elevator according to claim 1 including detecting terminals on said rotary member associated with counter electrodes mounted adjacent said rotary member for transmitting temperature of said rotary member detected by said temperature sensor means.

13. A control apparatus for an elevator according to claim 12 wherein said temperature sensor means receives the temperatures of said secondary windings by contacting said counter electrodes with said detecting terminals while said rotary member is stopped.

14. A control apparatus for an elevator according to claim 1 including a brake device for said induction motor having a radially movable brake arm adjacent the periphery of said rotary member, and said temperature sensor means includes detecting terminals on the periphery of said rotary member, electrode means carried by said brake arm and movable radially toward and away from said terminals on said rotary member, and means for transmitting to said voltage/frequency control device signals representing the temperatures of said rotary member when said electrode means abuts said detecting terminals.

15. A control apparatus for an elevator according to claim 1 wherein said induction motor includes a stator frame, said rotary member includes an end part facing said stator frame, and said temperature sensor means includes a housing mounted on said stator frame adjacent said end part of said rotary member, detecting terminals on said end part of said rotary member, electrode means carried by said housing and movable axially toward and away from said terminals on said end part of said rotary member, and means for transmitting to said voltage/frequency control device signals representing the temperatures of said rotary member when said electrode means abuts said detecting terminals.

* * * * *